US005911141A

United States Patent [19]

Kelley et al.

[11] Patent Number: 5,911,141

[45] Date of Patent: *Jun. 8, 1999

[54] ON-LINE HIERARCHICAL FORM RECORDS IDENTIFICATION

[75] Inventors: Edward Emile Kelley, Wappingers Falls; Daniel J. Armbrust, Hopewell Junction, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/554,881

[22] Filed: Nov. 7, 1995

[51] Int. Cl.[6] ...................................................... G06F 17/30

[52] U.S. Cl. ................................ 707/10; 707/511; 707/8; 707/203; 707/505; 707/514

[58] Field of Search .................................... 395/619, 608, 395/617, 703, 712, 772; 707/10, 505, 507, 203, 8, 514, 511

[56] References Cited

U.S. PATENT DOCUMENTS

| | | | |
|---|---|---|---|
| 4,903,229 | 2/1990 | Schmidt et al. | 707/200 |
| 5,008,853 | 4/1991 | Bly et al. | 345/331 |
| 5,159,669 | 10/1992 | Trigg et al. | 345/357 |
| 5,235,654 | 8/1993 | Anderson et al. | 382/180 |
| 5,274,806 | 12/1993 | Hill | 707/10 |
| 5,339,392 | 8/1994 | Risberg et al. | 345/333 |
| 5,561,793 | 10/1996 | Bennett et al. | 707/201 |
| 5,577,240 | 11/1996 | Demers et al. | 707/8 |
| 5,603,024 | 2/1997 | Goldring | 707/203 |
| 5,640,577 | 6/1997 | Scharmer | 707/507 |
| 5,664,207 | 9/1997 | Crumpler et al. | 707/505 |

FOREIGN PATENT DOCUMENTS

| | | |
|---|---|---|
| 60-243740 | 12/1985 | Japan . |
| 02086484 | 3/1990 | Japan . |
| 05173864 | 7/1993 | Japan . |

*Primary Examiner*—Thomas G. Black
*Assistant Examiner*—Greta L. Robinson
*Attorney, Agent, or Firm*—Alison D. Mortinger; Graham S. Jones, II

[57] ABSTRACT

An on-line records identification system for users in a multiple-level hierarchy. The system provides a record origin identifier associated with each record, wherein a unique record origin identifier is assigned to each original record. Also provided is a relative identifier associated with each record of a single user at a single level of the hierarchy, wherein a unique relative identifier is assigned to each original record. Further provided are means for transmitting a record from a user at a first level of the hierarchy to a user at a second level of the hierarchy and means for translating the relative identifier associated with the record at the first level to a relative identifier associated with the record at the second level. The on-line records identification scheme is well-suited for a client-server architecture that has separate processing and storage capability at each level of the hierarchy.

8 Claims, 4 Drawing Sheets

SERVER S2
LS
SERVER S1
LS
SERVER S1
LS
C
C
C
C
C
LS
LS
LS
LS
LS

400 USER 1

| | REL# | SUP# | FORM DESCRIPTION | REC ORG# |
|---|---|---|---|---|
| 402 | 001 | | Sales Call – Cust X | REC_ORG1 |
| 404 | 002 | | Initial Call – Cust Y | REC_ORG2 |
| 408 | 002 | AA | Followup Call – Cust Y | REC_ORG2 |
| 410 | 002 | AB | Followup Call – Cust Y | REC_ ORG2 |
| 406 | 003 | | Sales Call – Cust X Sub. | REC_ORG3 |

500 USER 2

| | REL# | SUP# | FORM DESCRIPTION | REC_ORG# |
|---|---|---|---|---|
| 502 | 001 | | Sales Call – Cust A | REC_ORG4 |
| 504 | 002 | | Initial Call – Cust B | REC_ORG5 |
| 506 | 002 | AA | Followup Call – Cust B | REC_ORG5 |

600 COLLECTOR

| | REL# | SUP# | FORM DESCRIPTION | REC_ORG# |
|---|---|---|---|---|
| 602 | 001 | | Initial Call – Cust B | REC_ORG5 |
| 608 | 001 | AA | Followup Call – Cust B | REC_ORG5 |
| 604 | 002 | | Sales Call – Cust X | REC_ORG1 |
| 606 | 003 | | Initial Call – Cust Y | REC_ORG2 |

FIG. 4

ON-LINE HIERARCHICAL FORM RECORDS IDENTIFICATION

FIELD OF THE INVENTION

This invention is directed to on-line form records for a data processing system, and more particularly to a hierarchical forms storage and identification scheme.

BACKGROUND OF THE INVENTION

On-line computerized form records systems have automated traditional hardcopy systems in that forms are filled in, sent, received, and processed on-line. A very important feature of on-line forms systems is keeping track of the individual forms. Typically, a unique identifier is generated for each form and access and tracking is performed using that unique identifier. All forms are stored in a central database and retrieved from the database upon request by a user, changes made, and an updated copy is sent back to the database.

With a central database, when a user changes a form, two operations can happen: (1) the changed form overwrites the original form and takes the same unique identifier, or (2) the changed form is saved as a new form with a new unique identifier. Either of these operations is less than ideal. Overwriting only saves the most current version of the form. If the forms for example represent a series of ongoing transactions, saving previous versions of the form is important. Creating a new form for every change solves the first issue, but presents a new one as well. As the number of users and forms increases, the system can be tremendously overloaded and processing becomes very slow. In addition, there is no way to identify or group different (past or future) versions of the same form.

Form tracking is also important at an individual user level. Each user needs to easily reference and process his or her own forms, rather than having to work through all forms belonging to all users.

In addition to the problems presented, current on-line form records processing systems are ill-suited to a distributed environment such as a client-server architecture. In such an arrangement, a client has local storage and processing resources that are separate from a server, which has more centralized storage and processing. Several clients can be associated with a server, and several lower level servers can be associated with a higher level server, for example. In this manner a multiple-level hierarchical system can be configured, with users at any level sending or receiving forms. Normally, however, forms are sent from lower levels (submitters) to higher levels (receivers or collectors). Note that the term "user" can mean an end user that uses a client or server workstation, or the "user" can be the workstation itself, depending on the degree of automation in the system. Users can originate, send, receive, and process form records. With such capabilities spread across a distributed system (like client-server), it is easily understood that an on-line forms system can have an overabundance of form records.

Thus, there remains a need for a system where on-line form records can be stored and accessed separately from a central database, and where different version of the same form are stored concurrently and are easily identified as belonging to an individual user.

SUMMARY OF THE INVENTION

It is therefore an object of the present invention to provide an on-line form record system where forms can be stored independently from a central database.

It is a further object to provide for form integrity between different storage across different levels of the hierarchy.

It is another object to provide a means for retaining past and current versions of the same form concurrently, and a way to identify the versions as originating from a common form.

It is yet another object to provide an identification scheme that allows a selective submission of forms within the hierarchy.

In accordance with the above listed and other objects, an on-line records identification system is described for users in a multiple-level hierarchy. The system provides a record origin identifier associated with each record, wherein a unique record origin identifier is assigned to each original record. Also provided is a relative identifier associated with each record of a single user at a single level of the hierarchy, wherein a unique relative identifier is assigned to each original record. Further provided are means for transmitting a record from a user at a first level of the hierarchy to a user at a second level of the hierarchy and means for translating the relative identifier associated with the record at the first level to a relative identifier associated with the record at the second level.

BRIEF DESCRIPTION OF THE DRAWINGS

These and other features, aspects, and advantages will be more readily apparent and better understood from the following detailed description of the invention, in which:

FIG. 4 illustrates a forms processing example in a two-level hierarchy; all in accordance with the present invention.

DESCRIPTION OF THE PREFERRED EMBODIMENTS

Figure 1:
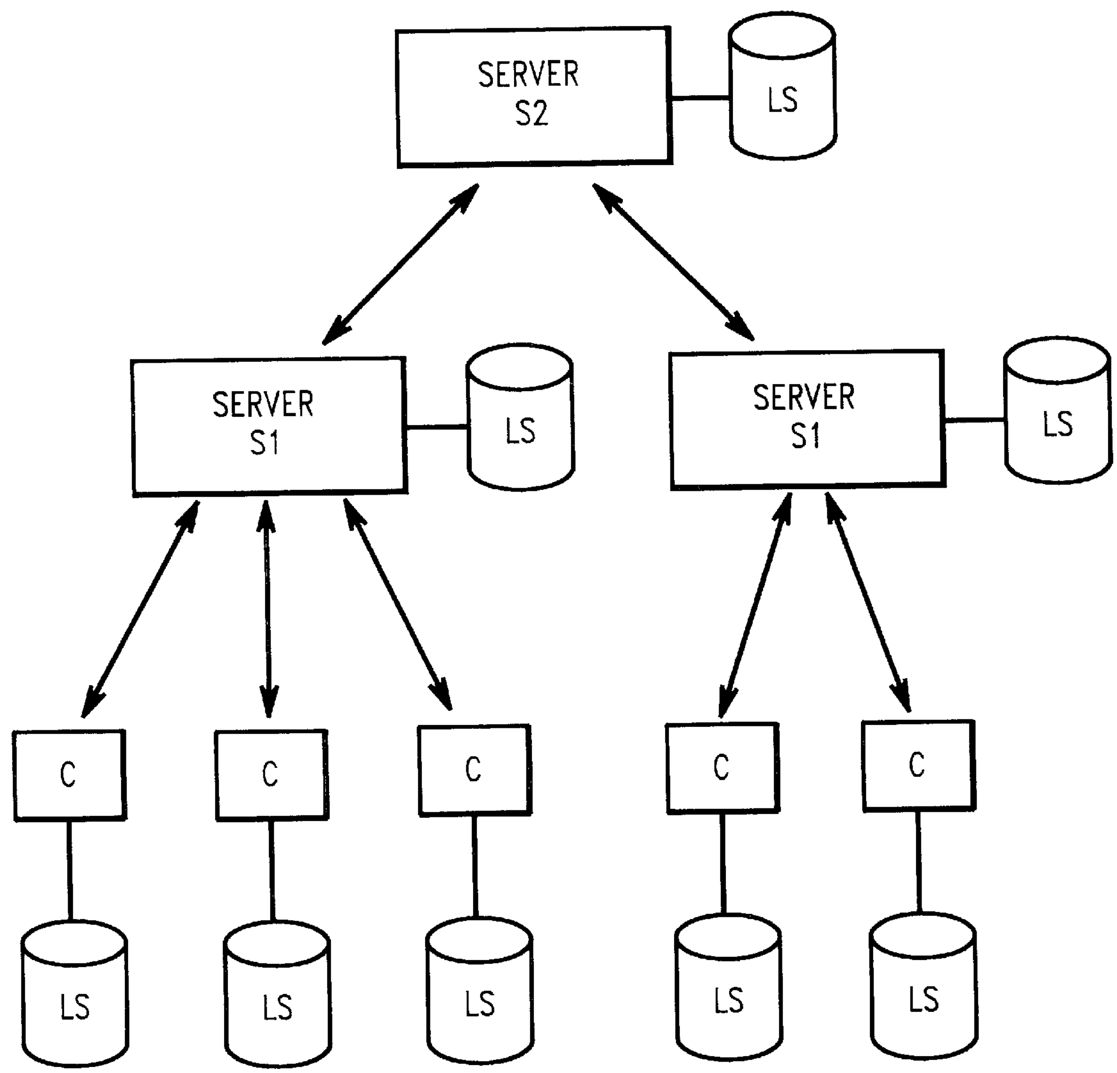
FIG. 1 is a diagram of a multiple-level hierarchy.

Referring now to the drawings and more particularly to FIG. 1, a three-level hierarchy is illustrated. At each level, clients and servers each have a local storage LS. Clients C work with on-line form records and submit forms to servers S1 at the middle level of the hierarchy. Servers S1 then submit forms to servers S2 at the top level of the hierarchy. Although not illustrated, note that Clients and Servers can be found at any level of the hierarchy. Forms can originate at any level, but typically originate with clients C, and the highest level server is typically used as a central storage and a single source for all the forms that have been submitted up through the hierarchy. Note also that all forms are not necessarily sent to the next level; forms can be retained indefinitely in local storage.

Figure 2:
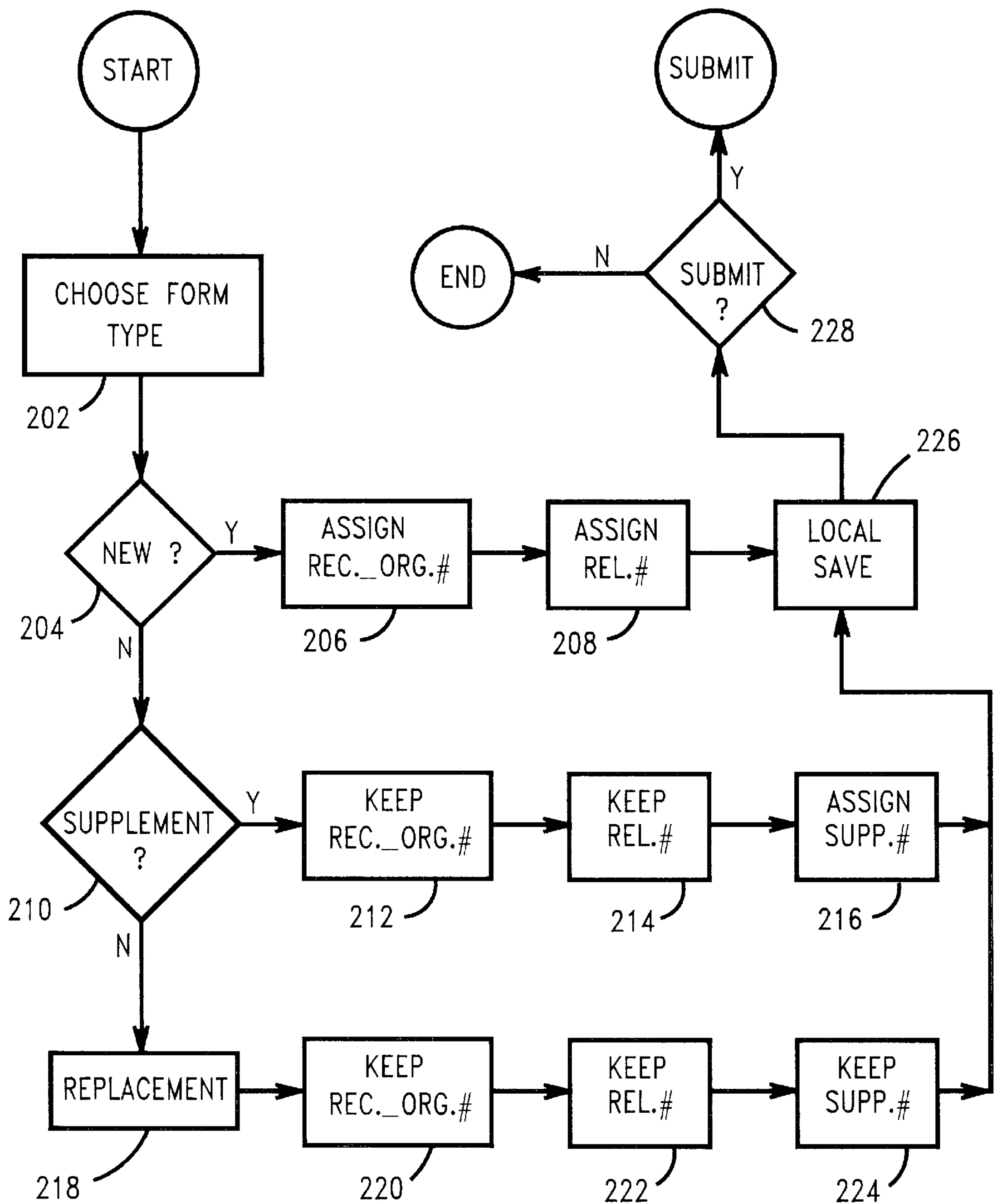
FIG. 2 is a flowchart for working with forms at a single level of the hierarchy.

FIG. 2 shows the process flow for working with forms at a single level of the hierarchy, including creating new forms and working with existing forms. Working with existing forms includes creating a new form using a current form as a template, supplementing a form, or replacing a form.

To begin working with the on-line forms system, a user first chooses the form type to work with in step 202. Note here that different categories of forms are possible (see the NETWORKING section) but the distinction is unimportant at this point.

CREATING NEW FORMS

If the form is a new form in step 204, a blank form is retrieved from a local forms database (storage). The user then completes the form, and at step 206 a new record origin identifier (REC_ORG#) is created by the forms system without being in communication with any central depository of identifiers. Any suitable scheme may be used to generate the record origin identifier, as long as each new form has an identifier different than any other new form for any user. One example is to use a combination of user address and timestamp.

In addition to the record origin identifier, a new relative identifier (REL#) is assigned to the new form in step 208. The relative identifier is assigned sequentially and serves to order the forms of an individual user. Note that the relative identifier is unique only to the user who originates the form. Thus different users at a single level of the hierarchy will have the same relative identifiers, but different record origin identifiers. A number with few digits works well and is easily displayed on-line.

WORK WITH CURRENT FORMS

Once the user has created a form and saved it locally the user may choose one of several options. Each option starts with the retrieval of an existing form from local storage.

(1) Create a New Form Using a Current Form as a Template

For convenience, the forms system allows a user to create a new form using an existing completed form as a starting point or template. This option is typically used when much of the information between two separate forms will be the same, and the user wishes to avoid retyping. This is essentially a new form from the system's perspective, and the flow follows from step 204.

(2) Supplement a Form (Make a New Version, Keeping the Old)

A user choosing to add to a form or change information in the form, saving the original form contents in a separate form will work with a supplemental form at step 210. After changes and/or additions are made, the supplemental form is assigned the same record origin and relative identifiers as the original form in steps 212 and 214, and is also assigned a supplemental identifier in step 216. For example, if the relative identifier is numeric, the supplemental identifier can be made of alphabetic characters. Note that if multiple supplements exist, the next available supplemental identifier will be assigned, regardless of which existing form of related forms was used to create the supplemental form.

(3) Replace an Existing Form

A user who seeks to update the contents of the form without saving the old contents will work with a replacement form in step 218. After modifications are entered, the replacement form retains the same record origin identifier in step 220, the same relative identifier in step 222, and if applicable, the same supplemental identifier in step 224. This is the same as overwriting the original form.

When the form (of any type) is complete, is stored in local storage at step 226 and the user has an option at step 228 to submit the form (for review or processing, for example) to another level of the hierarchy.

SUBMITTING FORMS

Figure 3:
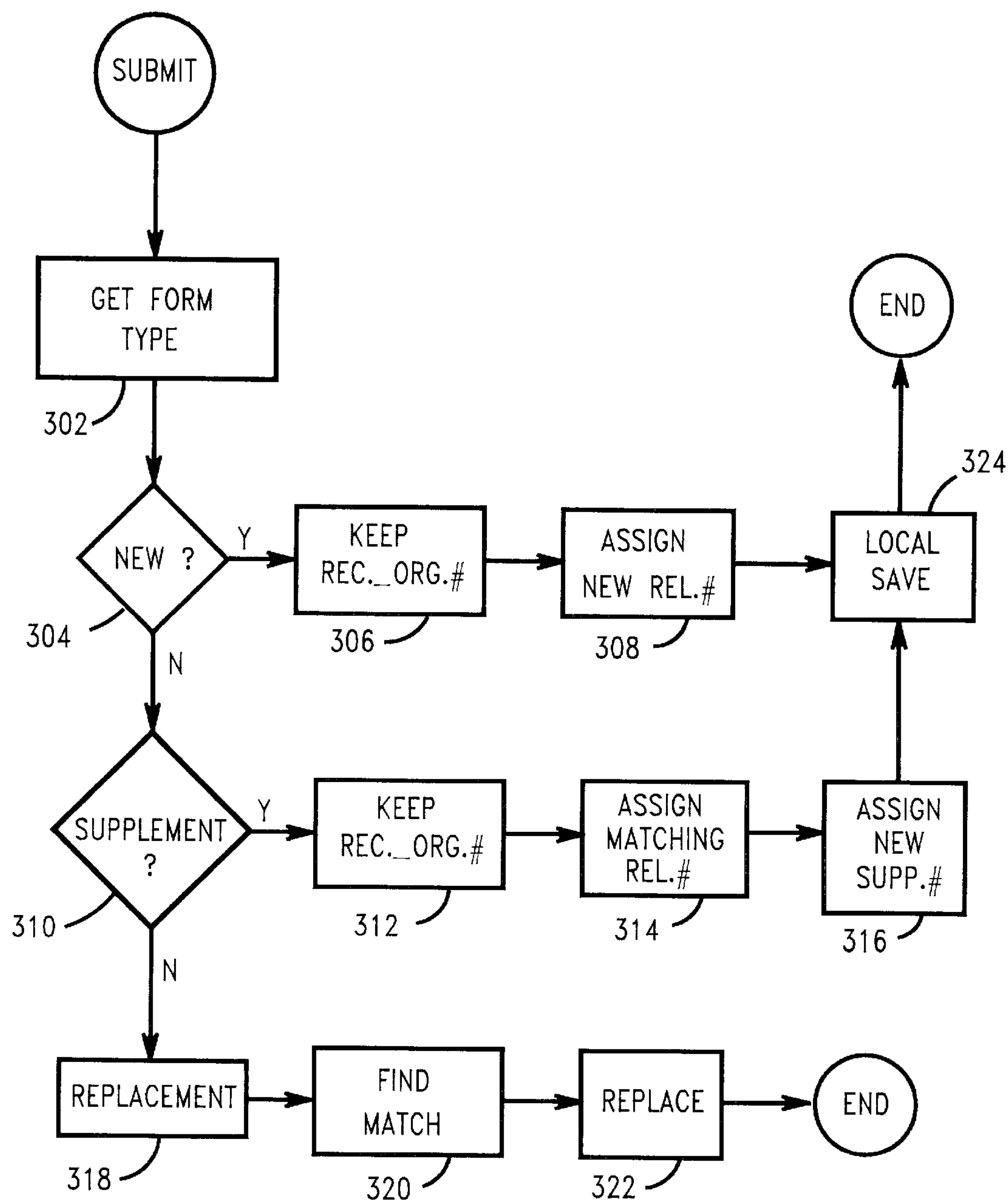
FIG. 3 is a flowchart for submitting a form to the next level of the hierarchy.

FIG. 3 shows the process flow for submitting forms to the next level of the hierarchy. The first step is to identify the form type in step 302.

If the form is a new form in step 304, then the REC_ORG# is kept in step 306, and a new REL# is assigned in step 308. Note that each user (client or server) has a set of relative identifiers, which can be the same as any other user's, and therefore the REL#s are only unique to a single user at a single level of the hierarchy.

Processing differs from single-level processing for supplemental and replacement forms at the server level. If the form is a supplemental form in step 310, the REC_ORG# is again kept in step 312. In step 314, the server assigns the same REL# as the REL# assigned by the server to the original record received from the client, and also the same as any previously submitted supplemental records. In order to get the proper REL#, the server checks local storage for a match on the REC_ORG#, and reads the corresponding REL#(s). The server also reads the corresponding SUPP#(s) and thus can assign the next available SUPP# in step 316. Note here also that each user (client or server) has a set of supplemental identifiers, which can be the same as any other user's, and therefore the SUPP#s are only unique to a single user at a single level of the hierarchy. For a replacement form in step 318, the server checks local storage in step 320 for a match on REC_ORG#, REL#, and SUPP# (if applicable) and simply replaces (overwrites) the current record in step 322.

From steps 308 and 316, once the identifiers have been properly assigned, the form records are saved in local storage in step 324. The form record then will be saved both in client-local and server-local storage. The form will have the same record origin identifier in both locations, but may (and probably will) have different relative and supplemental identifiers.

Note that not all forms from a lower level of the hierarchy will necessarily be submitted to the next level. Therefore the forms identification system has the capability to provide a complete identification system with local integrity at each level, by assigning new relative and supplemental identifiers. Note also that the form submission process is not required to be one-way from lower to higher levels; higher levels can submit forms to lower levels, for example for re-work.

EXAMPLE

FIG. 4 illustrates an example of the on-line hierarchical forms identification system. Such a forms system may be used, as in this example, to record sales calls with customers.

User 1's list 400 of forms that she has created is shown. Each item in the list corresponds to one form in her local storage. User 1 makes her first sales call to Customer X, and fills out an on-line form 402 to record the substance of the call. Form 402 is assigned a REL# (relative number) of 001, and REC_ORG# (record origin number) of REC_ORG1. Note that REC_ORG# is not shown on User 1's list; it is transparent to the User. This is not required; but because there is no need for User 1 to know the record origin number, there is no need to show it.

User 1 then fills in a new form 404 for a sales call with Customer Y. Form 404 is assigned a REL# of 002, and a REC_ORG# of REC_ORG2. User 1 then makes a sales call on a company that is a subsidiary of Customer X. Since much of the data in the form will be the same as in form 402, she uses form 402 to create form 406, a new version of form 402. Form 406 is assigned a new REC_ORG# of REC_ORG3 and a new REL# of 003. User 1 then makes a followup call to Customer Y, adds more information to form 404, and thus creates form 408, a supplement to form 404. Form 408 has the same REL# (002) and the same REC_ORG# (REC_ORG2) as form 404, but is assigned a SUP# (supplemental number) of AA. A second followup call to Customer Y likewise results in form 410, with REL# 002, REC_ORG# REC_ORG2, and SUP# AB.

Meanwhile, User 2 makes sales calls of his own, with customers A and B, resulting in form list 500 containing forms 502, 504, and 506. Note that User 2's relative numbers start at 001, like User 1's forms, but have record origin numbers that are distinct from User 1.

User 1 and User 2 submit their forms as they choose to Collector 1 for review and retention at Collector 1's local storage, as shown in list 600. User 2 first submits his form 504. When Collector 1 receives form 504, it becomes form 602. The same REC_ORG# (REC_ORG5) is retained, but a new REL# 001 is assigned. Next, User 1 submits her form 402. A check is made to see if form 402's REC_ORG# has any matches in the list of forms already received. None are found, so form 402 becomes the Collector's form 604, with REC_ORG1 retained and REL# 002 assigned. User 1 then submits her form 404, and it becomes form 606. Then User 2 submits his form 506. When the REC_ORG# is checked, there is a match with form 602. Form 506 thus becomes form 608 and is assigned the same REL# as form 602, and a SUP# of AA (and retaining REC_ORG5).

In the above example, there are only 2 users and 1 collector. In reality, the forms system can handle many users and many collectors in a multiple level hierarchy.

FORM RECORD STORAGE AND PROCESSING

To implement the form record identification scheme described, an individual form record is stored in a 1×m matrix of variable length. Each of the identifiers (plus other processing data such as date, time, update, complete, etc) is stored along with the form data in variable length fields that are accessible by relative position. The identifiers and form data are separated by an "end of identifiers" identifier. Storage of forms is thus in a matrix which is n long (n=number of form records) and m wide. The forms processing program then accesses the identifiers in a conventional manner to handle the different operations described above. Note that other conventional methods of record storage will also work.

NETWORKING

The on-line forms identification system can exist within an individual network, over multiple networks, and across multiple networks. This is accomplished by using a network table which exists on the clients and the servers. The network table contains a list of forms as well as addresses of clients and servers.

For routine processing, clients and servers communicate with other clients and servers in a hierarchy on a single network. For each level of the hierarchy, the network table will indicate the addresses of default servers that have blank or collected (submitted) forms, or both. Preferably, one server will collect all the forms for a network, but there can be as many as one server for each form. These servers are generally on the same network as the client. Note that there may be different servers for different form categories, and the hierarchy may be configured so that different servers perform different collection functions.

For exception processing, clients and servers do not follow the normal hierarchy; for example they might communicate with clients and servers on other networks, or they may skip levels in the hierarchy. These alternate channels of communication are also indicated in the network table. An exception client will have its address listed, as well as the address of the server that has its blank forms and of the server who will collect its submitted forms. An exception server will have the address listed of the server that will act as its collector as well. Note that with different categories of forms, clients or servers may be listed as exceptions only with regard to certain form categories, and routine with regard to others.

In the event that a server becomes unavailable, each client (or server acting as a client to another server) may elect to use any other server that is located anywhere in the hierarchy as its source of blank forms and to be the collector of forms. The preferred implementation is to use the next available server in the hierarchy as the forms collector, while any server may act as a source of blank forms.

Note also that the use of this type of process is not limited to the preferred embodiment. The term "form" has been used although any type of on-line hierarchical record or file storage which requires an identification scheme can be implemented in an equivalent manner.

Thus an on-line form record system has been described in which forms can be stored independently from a central database, with integrity between different storage across different levels of the hierarchy. Means have been provided for retaining past and current versions of (supplements to) the same form concurrently, and a way to identify the versions as originating from a common form. In addition, the identification scheme allows a selective submission of forms from a lower to a high level of the hierarchy.

While the invention has been described in terms of specific embodiments, it is evident in view of the foregoing description that numerous alternatives, modifications and variations will be apparent to those skilled in the art. Thus, the invention is intended to encompass all such alternatives, modifications and variations which fall within the scope and spirit of the invention and the appended claims.

What is claimed is:

1. An on-line records identification system further comprising a supplement to an original record, for users working with records in a multiple-level hierarchy, the system comprising:

means for storing and accessing on-line records in a multiple-level hierarchy separately from a central database;

a record origin identifier associated with each record, wherein a unique record origin identifier is assigned to each original record;

a relative identifier associated with each record, wherein a unique relative identifier is assigned to each original record of a single user at a single level of the hierarchy such that the forms of a single user may be organized; and means for translating the relative identifier is associated with the record at a first level to a relative identifier associated with the record at a second level.

(a) a supplemental identifier is associated with each supplement to an original record of a single user at a single level of the hierarchy, and a unique supplemental identifier is assigned to each supplement to an original record, (b) the record origin identifier is replicated for each supplement to an original record, and (c) the relative identifier is replicated for each supplement to an original record, such that different versions of the same form may be stored concurrently.

2. The on-line records identification system of claim 1 wherein the record origin identifier is assigned without reference to a central database in a manner ensuring uniqueness among all records of all users.

3. The on-line records identification system of claim 1 wherein the first level of the hierarchy is a client and the second level of the hierarchy is a server in a client-server architecture.

4. The on-line records identification system of claim 1 wherein the first level of the hierarchy is a server and the second level of the hierarchy is a client in a client-server architecture.

5. The on-line records identification system of claim 1 wherein each level of the hierarchy has separate storage.

6. The on-line records identification system of claim 1 wherein the means for translating the relative identifier comprises:

means for checking for a record at the second level having a record origin identifier matching the record from the first level; and if a match is found, means for assigning a relative identifier Identical to the relative identifier associated with the matching record, otherwise assigning a next available relative identifier.

7. The on-line records identification system of claim 1 wherein the multiple-level hierarchy comprises multiple networks.

8. An on-line forms identification system for users working with on-line form in a multiple-level hierarchy, the system comprising:

means for storing and accessing on-line forms in a multiple-level hierarchy separately from a central database;

a record origin Identifier associated with each a form, wherein a unique record origin identifier is assigned to each original form;

a relative identifier associated with each form, wherein a unique relative identifier is assigned to each original form of a single user at a single level of the hierarchy; and means for translating the relative identifier associated with the form at a first level to a relative identifier associated with the form at a second level, (a) a supplemental identifier is associated with each supplement to an original form of a single user at a single level of the hierarchy, and a unique supplemental identifier is assigned to each supplement to an original form, (b) the form origin identifier is replicated for each supplement to an original form, and (c) the relative identifier is replicated for each supplement to an original form, such that different versions of the same form may be stored concurrently.

* * * * *